(12) United States Patent  
Park et al.

(10) Patent No.: US 11,870,078 B2  
(45) Date of Patent: Jan. 9, 2024

(54) LITHIUM ELECTRODE AND LITHIUM SECONDARY BATTERY COMPRISING SAME

(71) Applicant: LG CHEM, LTD., Seoul (KR)

(72) Inventors: Eunkyung Park, Daejeon (KR); Bora Jung, Daejeon (KR); Minchul Jang, Daejeon (KR); Suk Il Youn, Daejeon (KR); Byoungkuk Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 72 days.

(21) Appl. No.: 16/971,247

(22) PCT Filed: Oct. 30, 2019

(86) PCT No.: PCT/KR2019/014494  
§ 371 (c)(1),  
(2) Date: Aug. 19, 2020

(87) PCT Pub. No.: WO2020/091426  
PCT Pub. Date: May 7, 2020

(65) Prior Publication Data  
US 2020/0388853 A1 Dec. 10, 2020

(30) Foreign Application Priority Data

Oct. 30, 2018 (KR) .................. 10-2018-0130444  
Oct. 30, 2019 (KR) .................. 10-2019-0136807

(51) Int. Cl.  
H01M 4/62 (2006.01)  
H01M 4/134 (2010.01)  
(Continued)

(52) U.S. Cl.  
CPC .......... *H01M 4/628* (2013.01); *H01M 4/134* (2013.01); *H01M 4/382* (2013.01); *H01M 4/626* (2013.01);  
(Continued)

(58) Field of Classification Search  
CPC ...... H01M 4/625; H01M 4/134; H01M 4/382; H01M 4/626; H01M 10/052;  
(Continued)

(56) References Cited

U.S. PATENT DOCUMENTS 6,096,453 A * 8/2000 Grunwald ......... H01M 10/0565  
429/212  
2004/0058232 A1 3/2004 Kim et al.  
(Continued)

FOREIGN PATENT DOCUMENTS

CN 1492523 A 4/2004  
CN 1675792 A 9/2005  
(Continued)

OTHER PUBLICATIONS

International Search Report (PCT/ISA/210) issued in PCT/KR2019/014494, dated Feb. 10, 2020.  
(Continued)

*Primary Examiner* — Sarah A. Slifka  
(74) *Attorney, Agent, or Firm* — Birch, Stewart, Kolasch & Birch, LLP

(57) ABSTRACT

A lithium electrode includes a protective layer containing an ion conductive electrolyte in the interior and on the surface of the electrically conductive matrix. The protective layer may make the electrical conductivity of the surface of the lithium electrode uniform, imparts strength during the growth of lithium dendrites, physically prevents the growth of lithium dendrites, and suppresses the generation of dead lithium.

10 Claims, 1 Drawing Sheet

(51) Int. Cl.
*H01M 4/38* (2006.01)
*H01M 10/052* (2010.01)
*H01M 10/0565* (2010.01)
*H01M 10/0567* (2010.01)
*H01M 10/0568* (2010.01)

(52) U.S. Cl.
CPC ..... *H01M 10/052* (2013.01); *H01M 10/0565* (2013.01); *H01M 10/0567* (2013.01); *H01M 10/0568* (2013.01); *H01M 2300/0037* (2013.01); *H01M 2300/0082* (2013.01); *H01M 2300/0091* (2013.01)

(58) Field of Classification Search
CPC ......... H01M 10/0565; H01M 10/0567; H01M 10/0568; H01M 2300/0037; H01M 23/0082; H01M 2300/0091; H01M 4/628
See application file for complete search history.

(56) References Cited

U.S. PATENT DOCUMENTS

| | | | |
|---|---|---|---|
| 2005/0095504 A1 | 5/2005 | Kim et al. | |
| 2006/0102869 A1 | 6/2006 | Cavaille et al. | |
| 2013/0213677 A1* | 8/2013 | Zhamu | H01G 11/06 173/217 |
| 2014/0011101 A1 | 1/2014 | Ma et al. | |
| 2014/0255780 A1 | 9/2014 | Mikhaylik et al. | |
| 2017/0271707 A1* | 9/2017 | Sasakawa | H01M 10/0585 |
| 2017/0346137 A1* | 11/2017 | Chang | H01M 10/0567 |
| 2018/0051137 A1 | 2/2018 | Kim et al. | |
| 2018/0053978 A1 | 2/2018 | Song et al. | |
| 2018/0301707 A1 | 10/2018 | Pan et al. | |
| 2019/0058185 A1 | 2/2019 | Lee et al. | |
| 2019/0237804 A1* | 8/2019 | Shi | C07D 317/10 |

FOREIGN PATENT DOCUMENTS

| | | |
|---|---|---|
| CN | 105190953 A | 12/2015 |
| EP | 3 509 138 A2 | 7/2019 |
| JP | 5241060 B2 | 7/2013 |
| KR | 10-2004-0026208 A | 3/2004 |
| KR | 10-0485336 B1 | 4/2005 |
| KR | 10-0542213 B1 | 1/2006 |
| KR | 10-2012-0000708 A | 1/2012 |
| KR | 10-2014-0006638 A | 1/2014 |
| KR | 10-2014-0112597 A | 9/2014 |
| KR | 10-2014-0120269 A | 10/2014 |
| KR | 10-2014-0126970 A | 10/2014 |
| KR | 10-2017-0099375 A | 8/2017 |
| KR | 10-2018-0019822 A | 2/2018 |
| KR | 10-2018-0020599 A | 2/2018 |
| KR | 10-2018-0036564 A | 4/2018 |
| WO | WO 01/97304 A1 | 12/2001 |
| WO | WO 2017/104867 A1 | 6/2017 |
| WO | WO 2018/034526 A1 | 2/2018 |

OTHER PUBLICATIONS

European Patent Office Search Report dated May 18, 2021 in family EP Applcation No. 19879721.9.

* cited by examiner

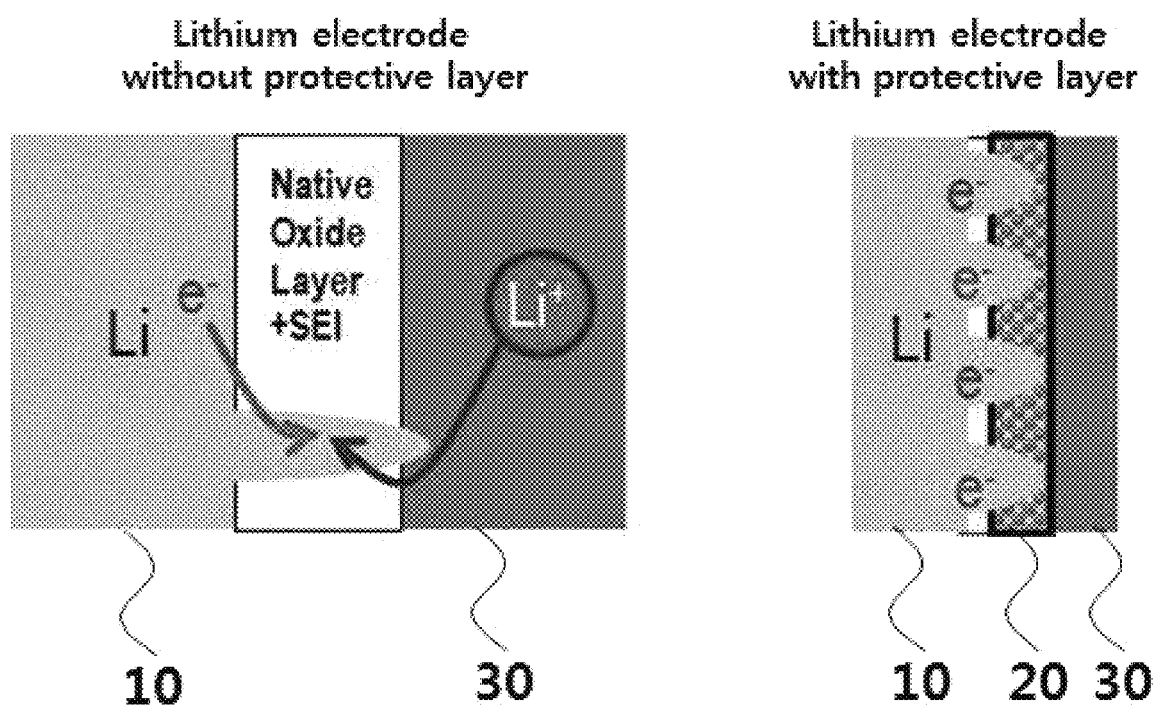

LITHIUM ELECTRODE AND LITHIUM SECONDARY BATTERY COMPRISING SAME

TECHNICAL FIELD

The present application claims the benefits of priorities based on Korean Patent Application No. 10-2018-0130444 filed on Oct. 30, 2018 and Korean Patent Application No. 10-2019-0136807 filed on Oct. 30, 2019, the entire contents of which are incorporated herein by reference.

The present invention relates to a lithium electrode having a uniform electrical conductivity on a lithium metal surface and a lithium secondary battery comprising the same.

BACKGROUND ART

Until a recent date, there has been considerable interest in developing batteries with high energy densities using lithium as a negative electrode. For example, as compared to other electrochemical systems with a lithium inserted carbon negative electrode that reduces the energy density of the battery by increasing the weight and volume of the negative electrode due to the presence of the non-electroactive material, and a nickel or cadmium electrode, since lithium metal has low weight and high capacity characteristics, lithium metal has attracted much attention as a negative electrode active material for electrochemical batteries. Lithium metal negative electrode, or negative electrodes, which mainly comprise lithium metal, provides the opportunity to construct a battery that is lighter and has a higher energy density than the battery such as a lithium-ion, nickel metal hydride, or nickel-cadmium battery. These features are highly desirable for batteries for portable electronic devices, such as cell phones and lap-top computers, where premiums are paid with low weighted value.

Conventional lithium ion batteries have an energy density of about 700 wh/l by using graphite as a negative electrode and using lithium cobalt oxide (LCO) as a positive electrode. However, in recent years, the fields requiring high energy density are expanding, and thus there is a continuing need to increase the energy density of a lithium ion battery. For example, even in order to increase the mileage of an electric car by a single charge to 500 km or more, an increase in energy density is required.

In order to increase the energy density of a lithium ion battery, the use of lithium electrodes is increasing. However, there is a problem that lithium metal is difficult to handle in process because it is highly reactive and difficult to handle.

If lithium metal is used as a negative electrode of a lithium secondary battery, the lithium metal reacts with impurities such as electrolytes, water or organic solvents, lithium salts and the like to form a passivation layer (Solid Electrolyte Interphase: SEI). Such a passivation layer causes localized current density differences to promote the formation of dendritic dendrite by lithium metal during charging, and the dendrite grows gradually during charging/discharging, thereby causing an internal short circuit between the positive electrode and the negative electrode. Also, the dendrite has a mechanically weak part (bottle neck), and thus forms inert lithium (dead lithium) which loses electrical contact with the current collector during discharging, thereby reducing the capacity of the battery, shortening the cycle lifetime, and adversely affecting the stability of the battery.

In order to improve the problems of the lithium metal negative electrode as described above, a lithium metal negative electrode with a protective layer having various compositions or forms has been developed.

Korean Patent Publication No. 2012-0000708 relates to a negative electrode for an electrochemical device, and discloses a porous conductive coating layer formed on a negative electrode active material layer. The porous conductive coating layer has a form in which conductive particles (e.g., carbon black, acetylene black, carbon fiber, etc.) are bound to each other by a binder.

Korean Patent Publication No. 2018-0036564 relates to a negative electrode for a lithium secondary battery comprising a lithium metal layer and a protective layer, wherein the protective layer is a conductive fabric having pores formed, and the conductive fabric is a conductive fabric formed by coating a metal material on the fabric of the yarn woven substrate.

As described above, until now, researches on the development of a protective layer to prevent the growth of the dendrite of lithium metal in a battery using lithium metal negative electrode have been made, but the results of the researches on the protective layer which is capable of improving the overall performance of the battery are insufficient.

Therefore, in order to improve the performance of the battery in the battery using lithium metal as a negative electrode, it is urgent to develop a lithium metal negative electrode which exhibits uniform electrical conductivity at the surface of the electrode, thereby inhibiting the growth of lithium dendrites and preventing the generation of dead Li.

PRIOR ART DOCUMENT

Patent Documents (Patent Document 1) Korean Patent Publication No. 2012-0000708.

(Patent Document 2) Korean Patent Publication No. 2018-0036564.

DISCLOSURE

Technical Problem

As a result of various studies to solve the above problems, one embodiment of the present invention have confirmed that by forming a protective layer on the lithium electrode, preferably by forming a protective layer having a form containing an ion conductive electrolyte in the interior and on the surface of the electrically conductive matrix, the electrical conductivity of the surface of the lithium electrode is uniform, the growth of lithium dendrites may be suppressed due to the strength by the protective layer, and the generation of dead Li may be suppressed.

Therefore, one embodiment of the of the present invention is to provide a lithium electrode having a uniform electrical conductivity.

In addition, another embodiment of the of the present invention is to provide a lithium secondary battery including a lithium electrode having a uniform electrical conductivity as described above.

Technical Solution

In order to achieve the above objects, the present invention provides a lithium electrode comprising: lithium metal layer; and a protective layer formed on at least one surface of the lithium metal layer, wherein the protective layer comprises an electrically conductive matrix and an ion conductive electrolyte.

The present invention also provides a lithium secondary battery comprising the lithium electrode.

Advantageous Effects

According to one embodiment of the present invention, the lithium electrode comprises a protective layer, and the protective layer has a structure in which an ion conductive electrolyte is formed in the interior and on the surface of the electrically conductive matrix, and thus there is an effect that the electrical conductivity of the surface of the lithium electrode is uniform.

In addition, as the electrical conductivity of the surface of the lithium electrode is uniform, it is possible to suppress the growth of lithium dendrites.

In addition, since the protective layer is formed on the surface of the lithium electrode while maintaining the appropriate strength, it is possible to further enhance the inhibitory effect of the growth of lithium dendrites, thereby preventing the generation of lithium disconnected from electrical contact (dead Li).

DESCRIPTION OF DRAWINGS

The Figure is a schematic diagram comparing the form of lithium dendrites depending on the presence or absence of the protective layer of the lithium electrode.

BEST MODE

Hereinafter, the present invention will be described in more detail in order to facilitate understanding of the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

Lithium Electrode

One embodiment of the present invention relates to a lithium electrode comprising: lithium metal; and a protective layer formed on at least one surface of the lithium metal, wherein the protective layer may comprise an electrically conductive matrix and an ion conductive electrolyte.

In the present invention, the electrically conductive matrix may be in the form of a three-dimensional structure in which internal spaces are formed. The internal spaces may be referred to as pores.

The ion conductive electrolyte may be filled in the internal spaces of the electrically conductive matrix, and also the electrically conductive matrix may be surrounded by the ion conductive electrolyte, that is, the ion conductive electrolyte may be formed on the surface of the electrically conductive matrix.

Due to this form of the protective layer, it is possible to make the electrical conductivity uniform on the surface of the lithium electrode, thereby inhibiting the growth of lithium dendrites.

In addition, due to the strength of the protective layer itself, it is possible to suppress the growth of lithium dendrites, thereby preventing the generation of lithium disconnected from electrical contact (dead Li).

In addition, in the protective layer, a weight ratio of the ion conductive polymer contained in the electrically conductive matrix and the ion conductive electrolyte may be 3:7 to 7:3. If the amount of the electrically conductive matrix is more than the appropriate weight while being outside the prescribed weight range as described above, since the content of the ion conductive polymer is relatively reduced, the Li ion conductivity of the protective layer is so low that more Li is grown on the protective layer, making it difficult to inhibit the growth of the Li dendrites. On the contrary, if the amount of the electrically conductive matrix is less than the appropriate weight while being outside the prescribed weight range as described above, the vertical/horizontal electrical conductivity may be degraded, making it difficult to transfer uniform electrons to the surface of the electrode.

If the ion conductive electrolyte is in a liquid or gel phase, the ion conductive polymer may uptake about 25 to 50% by weight of the electrolyte solution. In other words, the uptake amount of the electrolyte solution may be 25 to 50% by weight relative to 100% by weight of the ion conductive polymer, and the lithium ion conductivity may be the best within this range.

In addition, if the ion conductive electrolyte is in a solid phase, the ion conductive electrolyte may contain 25 to 50% by weight of the remaining components excluding the solvent in the electrolyte solution together with the ion conductive polymer. In other words, the content of the remaining components excluding the solvent in the electrolyte solution may be 25 to 50% by weight relative to 100% by weight of the ion conductive polymer. At this time, the remaining components except for the solvent in the electrolyte solution may be a lithium salt and an additive.

In the present invention, the sheet resistance of the protective layer may be $5 \times 10^{-2}$ Ω/sq. to 1000 Ω/sq., preferably $1 \times 10^{-2}$ Ω/sq. to 500 Ω/sq., more preferably $1 \times 10^{-2}$ Ω/sq. to 300 Ω/sq. If the sheet resistance is less than the above range, it is difficult to suppress the growth of Li dendrites because more Li grows on the protective layer. If the sheet resistance exceeds the above range, the coating layer may act as a large resistance layer, thereby deteriorating the lifetime characteristic of the battery.

In the present invention, the vertical lithium ion conductivity of the protective layer at room temperature may be $1 \times 10^{-6}$ S/cm to $1 \times 10^{-2}$ S/cm, preferably $1 \times 10^{-5}$ S/cm to $1 \times 10^{-2}$ S/cm, more preferably $1 \times 10^{-4}$ S/cm to $1 \times 10^{-2}$ S/cm. If the vertical lithium ion conductivity is less than the above range, the vertical ion conductivity is not good, so that more Li grows on the protective layer, making it difficult to inhibit the growth of Li dendrites. A protective layer whose vertical lithium ion conductivity exceeds this range may not be formed.

In the present invention, since the electrically conductive material contained in the electrically conductive matrix is uniformly distributed while forming a three-dimensional structure throughout the electrically conductive matrix, the protective layer may be able to exhibit a uniform electrical conductivity.

The electrically conductive material may be at least one selected from the group consisting of an electrically conductive metal, a semiconductor, and an electrically conductive polymer. The electrically conductive metal may be at least one selected from the group consisting of copper, gold, silver, aluminum, nickel, zinc, carbon, tin, and indium. The semiconductor may be at least one selected from the group consisting of silicon and germanium. The electrically conductive polymer may be at least one selected from the group consisting of poly(3,4-ethylenedioxythiophene) (PEDOT), polyaniline, polypyrrole, polythiophene, polyacetylene, polyphenylene, and poly(thienylene vinylene).

In the present invention, the ion conductive electrolyte contained in the electrically conductive matrix may comprise an ion conductive polymer.

The ion conductive polymer may be at least one selected from the group consisting of poly(ethylene oxide) (PEO), poly(polypropylene oxide) (PPO), poly(acrylonitrile) (PAN), and poly(vinylidene fluoride) (PVDF).

In addition, the ion conductive electrolyte may be a liquid, gel, or solid phase. The form of the ion conductive electrolyte may be determined depending on the characteristics of the ion conductive polymer.

For example, the ion conductive polymer may be (i) an ion conductive polymer exhibiting properties of being swelled by an electrolyte solution, or (ii) a polymer having an ethylene oxide group (EO group) and thus exhibiting ion conduction property per se.

(i) The ion conductive polymer exhibiting properties of being swelled by an electrolyte solution as the ion conductive polymer may be impregnated with the liquid phase or gel phase electrolyte to form a liquid phase or gel phase ion conductive electrolyte. An example of such a polymer may be PVDF.

(ii) The polymer having an ethylene oxide group (EO group) as the ion conductive polymer may form a solid phase ion conductive electrolyte with a lithium salt and an additional additive without a separate solvent. An example of such a polymer may be PEO.

The liquid phase or gel phase electrolyte contained in the liquid phase or gel phase ion conductive electrolyte may further include a lithium salt, a non-aqueous solvent, and additionally an additive. The solid ion conductive electrolyte may further contain a lithium salt and additionally an additive.

The lithium salt may be at least one selected from the group consisting of LiCl, LiBr, LiI, LiNO$_3$, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC (CF$_3$SO$_2$)$_3$, (CF$_3$SO$_2$)$_2$NLi, (FSO$_2$)$_2$NLi, lithium chloroborane, lithium lower aliphatic carboxylate, lithium tetraphenyl borate, and lithium imide.

In addition, as a non-aqueous solvent contained in the ion conductive electrolyte, those conventionally used in the electrolyte for lithium secondary battery may be used without limitation, and for example, ethers, esters, amides, linear carbonates, cyclic carbonates and the like may be used alone, respectively, or in mixtures of two or more thereof. Among them, a carbonate compound which is typically a cyclic carbonate, a linear carbonate, or a slurry thereof may be contained.

Specific examples of the cyclic carbonate compound may be at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a slurry of two or more thereof. Examples of such halides comprise, but are not limited to, fluoroethylene carbonate (FEC) and the like.

In addition, specific examples of the linear carbonate compound may representatively comprise, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate, or a slurry of two or more thereof. In particular, ethylene carbonate and propylene carbonate, which are cyclic carbonates among the carbonate-based organic solvent, are highly viscous organic solvents having a high dielectric constant, so that the lithium salt in the electrolyte may be more easily dissociated. If such cyclic carbonates are mixed with linear carbonates having a low viscosity and a low dielectric constant, such as dimethyl carbonate and diethyl carbonate, in an appropriate ratio, an electrolyte solution having a higher electrical conductivity may be prepared.

In addition, the ether among the non-aqueous solvents may be, but is not limited to, at least one selected from the group consisting of dimethyl ether, diethyl ether, dipropyl ether, methylethyl ether, methylpropyl ether, and ethylpropyl ether, or a mixture of two or more thereof.

In addition, the ester among the non-aqueous solvents may be, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, and a mixture of two or more thereof.

In addition, the additive contained in the ion conductive electrolyte may be at least one selected from the group consisting of fluoroethylene carbonate (FEC), 1,3-propane-sultone (1,3-PS), and vinyl ethylene carbonate (VEC), preferably, fluoroethylene carbonate (FEC).

The content of the additive may be 2 to 13% by weight, preferably 3 to 10% by weight, more preferably 4 to 8% by weight, based on the total weight of the electrolyte. If the content of the additive is within the above range, the lifetime characteristic of the lithium secondary battery may be improved, and the thickness expansion ratio of the lithium secondary battery may be reduced.

As described above, the lithium electrode comprising the protective layer containing the electrically conductive matrix and the ion conductive electrolyte may prevent the growth of lithium dendrites.

The Figure is a schematic diagram comparing the form of lithium dendrites depending on the presence or absence of the protective layer of the lithium electrode.

Referring to the Figure, it can be seen that in the case of the lithium electrode without a protective layer, the solid electrolyte interphase (SEI) layer formed at an interface between the native oxide layer on the surface of the lithium metal 10 and the electrolyte 30 is formed, and the oxide layer and the SEI are electrically nonconductive so that the electrical conductivity of the surface of the lithium metal 10 is locally nonuniform, thereby causing the growth of lithium dendrites.

On the other hand, in the case of the lithium electrode with a protective layer containing the electrically conductive matrix and the ion conductive electrolyte as described above, the growth of lithium dendrites is suppressed due to the protective layer 20 formed on the surface of the lithium metal 10.

Preparation Method of Lithium Electrode

The present invention also relates to a method for preparing a lithium electrode.

The method for preparing a lithium electrode according to the present invention may vary depending on the form of the ion conductive electrolyte contained in the protective layer formed on the lithium electrode. The ion conductive electrolyte may be classified into a liquid or gel phase and a solid phase depending on the characteristics of the ion conductive polymer contained in the ion conductive electrolyte, and the method of preparing the lithium electrode may be different depending on the form of such an ion conductive electrolyte.

Preparation Method of Lithium Electrode with Protective Layer Containing Liquid Phase or Gel Phase Ion Conductive Electrolyte In the present invention, the method for preparing the lithium electrode with the protective layer containing the liquid or gel phase ion conductive electrolyte may comprise the steps of: (S1) applying an ion conductive polymer to the release film to form an ion conductive polymer layer; (S2) depositing an electrically conductive material on the ion conductive polymer layer to form an electrically conductive matrix inside the ion conductive polymer layer; (S3) transferring the ion conductive polymer layer, on which the electrically conductive matrix is formed, to form a lithium electrode; and (S4) impregnating the lithium electrode into an electrolyte solution to form a protective layer containing the electrically conductive matrix and the ion conductive electrolyte.

In step (S1), the ion conductive polymer may be applied to the release film to form an ion conductive polymer layer.

The material and thickness of the release film is not particularly limited, and various films may be used. As the release film, for example, a polyethylene terephthalate (PET) film, polyethylene (PE) film, polypropylene (PP) film, silicon-based release film and the like may be used, and the thickness of the release film may be, for example, 12 µm to 80 µm.

In addition, the ion conductive polymer is not particularly limited as long as the polymer exhibits the property of being swelled by the electrolyte solution. The ion conductive polymer may be, for example, poly (vinylidene fluoride) (PVDF).

The thickness of the ion conductive polymer layer is not particularly limited, and may be, for example, a thickness suitable in the range of 100 nm to 1 µm, preferably 150 nm to 300 nm.

The method of forming the ion conductive polymer layer may use a variety of coating methods that may be used to form a coating layer in the art. For example, the coating method may be selected from the group consisting of dip coating, spray coating, spin coating, die coating, roll coating, Slot-die coating, Bar coating, Gravure coating, Comma coating, Curtain coating, and Micro-Gravure coating.

Also, at the time of coating, the ion conductive polymer may be prepared as a coating liquid, and then coating may be performed.

In addition, the solvent used to prepare the coating solution may be at least one selected from the group consisting of tetrahydrofuran (THF), toluene, cyclohexane, N-methyl-2-pyrrolidone (NMP), dimethyl formamide (DMF), dimethyl acetamide (DMAc), tetramethyl urea, dimethyl sulfoxide (DMSO), and triethyl phosphate.

In addition, the concentration of the ion conductive polymer in the coating solution may be 1 to 15% by weight, preferably 2 to 10% by weight, more preferably 3 to 8% by weight. If the concentration of the ion conductive polymer is less than the above range, the protective function for lithium metal may be lowered. If the concentration of the ion conductive polymer exceeds the above range, the concentration of the coating solution may be excessively increased, making it difficult to proceed with the coating process, and also, even when a protective layer is formed, cracks may occur.

In addition, the solvent used to prepare the coating solution may be at least one selected from the group consisting of tetrahydrofuran (THF), toluene, cyclohexane, N-methyl-2-pyrrolidone (NMP), dimethyl formamide (DMF), dimethyl acetamide (DMAc), tetramethyl urea, dimethyl sulfoxide (DMSO), and triethyl phosphate. Preferably, if THF is used to prepare the coating solution, the solubility of the electrically conductive matrix may be high and it may be advantageous to form a protective layer by a coating process.

The ion conductive polymer layer may be in the form of porous layer.

In step (S2), an electrically conductive material may be deposited on the ion conductive polymer layer to form an electrically conductive matrix inside the ion conductive polymer layer.

In this case, when the electrically conductive material is deposited, the particles of the electrically conductive material penetrate into the inside of the ion conductive polymer layer, and particles of the electrically conductive material are inserted into the ion conductive polymer layer. The particles of the electrically conductive material inserted into the inside of the ion conductive polymer layer may be inserted in the form of islands, and also may be connected to each other to form a skeleton of a three-dimensional structure and thus form an electrically conductive matrix, and the island shape and the three-dimensional structure may be formed together.

In other words, the ion conductive polymer may be contained in the inner space of the electrically conductive matrix, or the ion conductive polymer may be formed on the surface of the electrically conductive matrix to surround the electrically conductive matrix.

In step (S3), a lithium electrode may be formed by transferring the ion conductive polymer layer, on which the electrically conductive matrix is formed, onto lithium metal.

The lithium metal may be formed on the current collector. The current collector is not particularly limited as long as it is conductive without causing chemical changes in the battery. For example, the current collector may be at least one selected from the group consisting of copper, stainless steel, aluminum, nickel, titanium, and sintered carbon.

In step (S4), the lithium electrode may be impregnated into an electrolyte solution to form a protective layer comprising the electrically conductive matrix and the ion conductive electrolyte.

The electrolyte solution may comprise a lithium salt and a non-aqueous solvent, and may further comprise an additive. The specific composition of the electrolyte is as described above.

If the lithium electrode is impregnated with an electrolyte solution, the electrolyte solution may be permeated into the ion conductive polymer, thereby forming an ion conductive electrolyte. In this case, the ion conductive electrolyte may be in a liquid or gel phase.

Therefore, the lithium electrode may be prepared to comprise a protective layer containing an electrically conductive matrix and an ion conductive electrolyte on the lithium metal.

Preparation Method of Lithium Electrode with Protective Layer Containing Solid Phase Ion Conductive Electrolyte In the present invention, the method for preparing a lithium electrode with a protective layer containing a solid phase ion conductive electrolyte may comprises the steps of (P1) applying a mixture of an ion conductive polymer and a lithium salt to a release film to form an ion conductive electrolyte layer; (P2) depositing an electrically conductive material on the ion conductive electrolyte layer to form a protective layer comprising an electrically conductive matrix and an ion conductive electrolyte; and (P3) transferring the protective layer onto a lithium electrode.

In step (P1), a mixture of an ion conductive polymer and a lithium salt may be applied to a release film to form an ion conductive electrolyte layer. In this case, an additive may be further mixed with the mixture, and the lithium salt and the additive may be the same as the lithium salt and the additive contained in the electrolyte as described above.

The method of forming the ion conductive electrolyte layer and the thickness thereof may be the same as the method of forming the ion conductive polymer layer described above and the thickness thereof.

In addition, the ion conductive electrolyte layer may be in a solid phase.

In step (P2), an electrically conductive material may be deposited on the ion conductive electrolyte layer to form a protective layer comprising an electrically conductive matrix and an ion conductive electrolyte.

In this case, when the electrically conductive material is deposited, the particles of the electrically conductive material penetrate into the inside of the ion conductive electrolyte layer, and particles of the electrically conductive material are inserted into the ion conductive electrolyte layer. The particles of the electrically conductive material inserted into the inside of the ion conductive electrolyte layer may be inserted in the form of islands, and also may be connected to each other to form a skeleton of a three-dimensional structure and thus form an electrically conductive matrix, and the island shape and the three-dimensional structure may be formed together.

In other words, the ion conductive electrolyte may be contained in the inner space of the electrically conductive matrix, or the ion conductive electrolyte may be formed on the surface of the electrically conductive matrix to surround the electrically conductive matrix.

In step (P3), the protective layer may be transferred onto a lithium metal to form a lithium electrode.

The lithium electrode may have a structure comprising a protective layer which comprises an electrically conductive matrix and an ion conductive electrolyte on a lithium metal.

Lithium Secondary Battery

The present invention also relates to a lithium secondary battery comprising the lithium electrode as described above.

In the lithium secondary battery, the lithium electrode may be comprised as a negative electrode, and the lithium secondary battery may comprise an electrolyte solution provided between the negative electrode and the positive electrode.

The shape of the lithium secondary battery is not limited, and may be, for example, coin type, flat type, cylindrical type, horn type, button type, sheet type, or stacked type. In addition, the lithium secondary battery may further comprise a respective tank for storing a positive electrode electrolyte solution and a negative electrode electrolyte solution, and a pump for moving each electrolyte solution to the electrode cell, and thus may be manufactured as a flow battery.

The electrolyte solution may be an electrolyte solution impregnated into the negative electrode and the positive electrode.

The lithium secondary battery may further comprise a separator provided between the negative electrode and the positive electrode. The separator disposed between the positive electrode and the negative electrode is not particularly limited as long as it separates or isolates the positive and negative electrodes from each other, and allows the transport of ions between the positive and negative electrodes. The separator may be, for example, a non-conductive porous membrane or an insulating porous membrane. More specifically, polymer nonwovens such as nonwoven fabric of polypropylene material or nonwoven fabric of polyphenylene sulfide material; or porous films of olefin resins such as polyethylene and polypropylene may be exemplified, and it is also possible to use two or more types of these together.

The lithium secondary battery may further comprise a positive electrode electrolyte solution on the positive electrode side and a negative electrode electrolyte solution on the negative electrode side separated by a separator. The positive electrode electrolyte solution and the negative electrode electrolyte solution may comprise a solvent and an electrolytic salt, respectively. The positive electrode electrolyte solution and the negative electrode electrolyte solution may be the same or different from each other.

The electrolyte solution may be an aqueous electrolyte solution or a non-aqueous electrolyte solution. The aqueous electrolyte solution may contain water as a solvent, and the non-aqueous electrolyte solution may contain a non-aqueous solvent as a solvent.

The nonaqueous solvent may be selected from those generally used in the art and is not particularly limited, and for example, may be selected from the group consisting of a carbonate-based solvent, an ester-based solvent, an ether-based solvent, a ketone-based solvent, an organosulfur-based solvent, an organophosphorous-based solvent, an aprotic solvent, or a combination thereof.

The electrolytic salt refers to those that dissociate into cations and anions in water or non-aqueous organic solvents, and is not particularly limited as long as it may deliver lithium ion in the lithium secondary battery. The electrolytic salt may be selected from those generally used in the art.

The concentration of the electrolytic salt in the electrolyte solution may be 0.1 M or more and 3 M or less. In this case, the charging/discharging characteristics of the lithium secondary battery may be effectively expressed.

The electrolyte may be a solid electrolyte membrane or a polymer electrolyte membrane.

The material of the solid electrolyte membrane and the polymer electrolyte membrane is not particularly limited, and may be those generally used in the art. For example, the solid electrolyte membrane may comprise a composite metal oxide, and the polymer electrolyte membrane may be a membrane having a conductive polymer inside the porous substrate.

The positive electrode refers to an electrode that accepts electrons and reduces lithium-containing ions when the battery is discharging in the lithium secondary battery. On the contrary, when the battery is charged, it acts as a negative electrode (oxidation electrode), and the positive electrode active material is oxidized to release electrons and lose lithium-containing ions.

The positive electrode may comprise a positive electrode current collector and a positive electrode active material layer formed on the positive electrode current collector.

In the present invention, the material of the positive electrode active material of the positive electrode active material layer is not particularly limited as long as it is applied to a lithium secondary battery together with the negative electrode to reduce lithium-containing ions during discharging and oxidize lithium-containing ions during charging. The material of the positive electrode active material may be, for example, a composite material based on a transition metal oxide or sulfur (S), and may specifically include at least one of $LiCoO_2$, $LiNiO_2$, $LiFePO_4$, $LiMn_2O_4$, $LiNi_xCo_yMnzO_2$ (wherein x+y+z=1), $Li_2FeSiO_4$, $Li_2FePO_4F$, and $Li_2MnO_3$.

In addition, if the positive electrode is a composite material based on sulfur (S), the lithium secondary battery may be a lithium-sulfur battery. The composite material based on sulfur (S) is not particularly limited, and a material of a positive electrode commonly used in the art may be selected and applied.

The present specification provides a battery module comprising the lithium secondary battery as a unit cell.

The battery module may be formed by stacking on a bipolar plate provided between two or more lithium secondary batteries according to one embodiment of the present specification.

If the lithium secondary battery is a lithium air battery, the bipolar plate may be porous to supply externally supplied air to a positive electrode comprised in each of the lithium air batteries. The bipolar plate may comprise, for example, porous stainless steel or porous ceramics.

Specifically, the battery module may be used as a power source of an electric vehicle, a hybrid electric vehicle, a plug-in hybrid electric vehicle, or a power storage device.

Hereinafter, preferred examples are provided to help understanding of the present invention, but the following examples are only for exemplifying the present invention, and it is apparent to those skilled in the art that various changes and modifications may be made within the scope and spirit of the present invention, and such changes and modifications are within the scope of the appended claims.

EXAMPLE 1

Lithium Electrode Comprising Cu Matrix and PVDF (1) Preparation of Lithium Electrode Polyvinylidene fluoride (PVDF) was coated on one surface of a silicon-based release film (SKC Hass company) at a thickness of 200 nm to form a PVDF coating layer.

Cu was deposited on one surface of the PVDF coating layer. As the Cu was vacuum deposited on one surface of the PVDF coating layer, Cu particles penetrated into the PVDF coating layer and the Cu particles were electrically connected to each other in the PVDF coating layer to form a Cu matrix in the form of a three-dimensional structure having a space therein. At this time, the weight ratio of Cu and PVDF was set to be 50:50.

Thereafter, the PVDF coating layer on which the Cu matrix was formed was transferred to one surface of 20 μm lithium metal to prepare a lithium electrode.

The lithium electrode was impregnated into the electrolyte solution so that the electrolyte solution was penetrated into the PVDF coating layer and thus the PVDF coating layer was formed to form a gel phase ion conductive electrolyte. The electrolyte solution was prepared by adding 5% by weight of fluoroethylene carbonate (FEC) as an additive to a solution in which 1.3M $LiPF_6$, a lithium salt, was mixed in a solvent (EC:DEC=1:1 (v/v), EC: ethylene carbonate, DEC: diethyl carbonate). At this time, the amount of the uptake of the electrolyte solution was 35% by weight as compared to 100% by weight of PVDF.

The finally prepared lithium electrode has a structure in which a protective layer is formed on one surface of a lithium metal, and the protective layer is in a form in which PVDF is formed on an inner space and a surface of the Cu matrix.

(2) Preparation of Lithium Secondary Battery

Li/separator/Li symmetric cell was prepared using the prepared lithium electrode. At this time, LC2001 of SK innovation company was used as the separator.

EXAMPLE 2

Lithium Electrode Comprising Ge Matrix and PVDF

A lithium electrode and a lithium secondary battery were manufactured in the same manner as in Example 1, except that Ge is used instead of Cu.

COMPARATIVE EXAMPLE 1

Lithium Electrode with PVDF Coating Layer Formed as Protective Layer

A lithium electrode and a lithium secondary battery were manufactured in the same manner as in Example 1, except that a PVDF coating layer having a thickness of 200 nm is formed as a protective layer.

COMPARATIVE EXAMPLE 2

Lithium Electrode without Protective Layer

A lithium electrode and a lithium secondary battery were manufactured in the same manner as in Example 1, except that no protective layer is formed on the lithium metal.

EXPERIMENTAL EXAMPLE 1

For the lithium secondary battery manufactured in the example and comparative examples, charging and discharging were performed at a current of 0.5 $mA/m^2$ and a capacity of 1 $mAh/m^2$ to measure lifetime characteristics, and the results are shown in Table 1 below.

TABLE 1

| | | Protective layer | | | | |
|---|---|---|---|---|---|---|
| | | Electrically conductive matrix | Ion conductive electrolyte | | Electrical conductivity of electrically conductive | Short occurrence |
| | Presence or absence of protective layer | Electrically conductive material | Ion conductive polymer | Electrolyte solution | material (S/cm) | time (cycle) |
| Example 1 | ○ | Cu | PVDF | EC:DEC = 1:1(v/v) | $5.8 \times 10^7$ | 220 |
| Example 2 | ○ | Ge | PVDF | $LiPF_6$ 1.3M | $1.0 \times 10^2$ | 140 |

TABLE 1-continued

| | Protective layer | | | | |
|---|---|---|---|---|---|
| | | Electrically conductive matrix | Ion conductive electrolyte | | Electrical conductivity of electrically conductive | Short occurrence |
| Presence or absence of protective layer | Electrically conductive material | Ion conductive polymer | Electrolyte solution | material (S/cm) | time (cycle) |
| Comparative Example 1 | ○ | — | — | FEC 5% by weight | — | 100 |
| Comparative Example 2 | X | — | — | — | — | 92 |

As shown in Table 1, it can be seen that in the case of Examples 1 and 2 which are lithium secondary batteries comprising the lithium electrode on which the protective layer comprising the electrically conductive matrix and the ion conductive electrolyte is formed, the short occurrence time is later than that of Comparative Examples 1 and 2, resulting in improved lifetime.

As described above, although the present invention has been described by way of limited examples and drawings, but the present invention is not limited thereto, and various modifications and variations are possible by those of ordinary skill in the art within the scope of the technical spirit of the present invention and the equivalent scope of the claims to be described below.

DESCRIPTION OF SYMBOLS

10: Lithium metal
20: Protective layer
30: Electrolyte solution

The invention claimed is:

1. A lithium electrode comprising:
lithium metal layer; and
a protective layer formed on at least one surface of the lithium metal layer,
wherein the protective layer comprises an electrically conductive matrix and an ion conductive electrolyte,
wherein the electrically conductive matrix is a three-dimensional structure having an inner space and a surface,
wherein the ion conductive electrolyte is present in the inner space of the electrically conductive matrix and on the surface of the electrically conductive matrix, and
wherein the electrically conductive matrix is consists of germanium.

2. The lithium electrode according to claim 1, wherein the ion conductive electrolyte comprises an ion conductive polymer.

3. The lithium electrode according to claim 2, wherein the ion conductive polymer is at least one selected from the group consisting of poly(ethylene oxide) (PEO), poly(polypropylene oxide) (PPO), poly(acrylonitrile) (PAN), and poly(vinylidene fluoride) (PVDF).

4. The lithium electrode according to claim 2, wherein the ion conductive electrolyte is a liquid or gel phase ion conductive electrolyte; or a solid phase ion conductive electrolyte.

5. The lithium electrode according to claim 4, wherein the liquid or gel phase ion conductive electrolyte comprises an electrolyte solution comprising a lithium salt, a non-aqueous solvent, and an additive.

6. The lithium electrode according to claim 5, wherein the lithium salt is at least one selected from the group consisting of LiCl, LiBr, LiI, $LiNO_3$, $LiClO_4$, $LiBF_4$, $LoB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, lithium chloroborane, lithium lower aliphatic carboxylate, lithium tetraphenyl borate, and lithium imide.

7. The lithium electrode according to claim 5, wherein the additive is at least one selected from the group consisting of fluoroethylene carbonate (FEC), 1,3-propanesultone (1,3-PS), and vinyl ethylene carbonate (VEC).

8. The lithium electrode according to claim 2, wherein a weight ratio of the electrically conductive matrix; and the ion conductive polymer present in the ion conductive electrolyte is 3:7 to 7:3.

9. The lithium electrode according to claim 1, wherein a thickness of the protective layer ranges from 150 nm to 300 nm.

10. A lithium secondary battery comprising the lithium electrode of claim 1.

* * * * *